US006794616B1

(12) United States Patent
Goenka

(10) Patent No.: US 6,794,616 B1
(45) Date of Patent: Sep. 21, 2004

(54) SOLDER REFLOW OVEN

(75) Inventor: Lakhi Nandlal Goenka, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/410,081

(22) Filed: Apr. 9, 2003

(51) Int. Cl.[7] .......................... F27D 11/00; A21B 1/00; B23K 1/00

(52) U.S. Cl. ....................... 219/400; 219/388; 219/391; 228/42; 228/180.1

(58) Field of Search ................................ 219/388, 390, 219/391, 400; 228/42, 180.1, 43, 49.5, 180.22

(56) References Cited

U.S. PATENT DOCUMENTS 3,515,330 A * 6/1970 Bronson et al. ............... 228/8
4,321,031 A 3/1982 Woodgate
4,805,827 A 2/1989 Coffman et al.
5,163,599 A 11/1992 Mishina et al.
5,193,735 A * 3/1993 Knight ........................ 228/42
5,203,487 A 4/1993 Mishina et al.
5,347,103 A * 9/1994 LeMieux .................... 219/400
5,358,167 A 10/1994 Tachibana et al.
5,449,422 A * 9/1995 Pflanz et al. ................ 148/601
5,467,912 A 11/1995 Mishina et al.
5,524,812 A * 6/1996 Taniguchi et al. ....... 228/180.1
5,573,688 A * 11/1996 Chanasyk et al. .......... 219/388
5,577,657 A * 11/1996 Glovatsky ................ 228/180.1
6,247,630 B1 6/2001 Terry et al.
6,437,289 B1 * 8/2002 Yokota ....................... 219/388
6,642,485 B2 * 11/2003 Goenka et al. ............. 219/400
2003/0102297 A1 * 6/2003 Goenka et al. ............. 219/400

* cited by examiner

*Primary Examiner*—L. Edmondson
(74) *Attorney, Agent, or Firm*—Brinks Hofer Gilson & Lione

(57) ABSTRACT

A solder flow oven comprises a reflow zone for heating a workpiece using heated air to a temperature effective to reflow solder. The reflow zone comprises a nozzle having divergent vanes that direct shear layers into neighboring zones to extend the distance over which the workpiece is heated to effective solder reflow temperature.

14 Claims, 2 Drawing Sheets

SOLDER REFLOW OVEN

TECHNICAL FIELD OF THE INVENTION

This invention relates to a solder reflow oven that uses heated air to heat a workpiece to a temperature effective to reflow solder. More particularly, this invention relates to such solder reflow oven wherein the heated air is directed through a divergent nozzle to extend the distance or time that the workpiece is heated to solder reflow temperatures.

BACKGROUND OF THE INVENTION

A typical microelectronic assembly comprises electronic components attached to a printed circuit board by solder bonds. Solder bonds are commonly formed using a solder paste comprising solder particles dispersed in a vaporizable vehicle. The solder paste is applied to bond pads on the printed circuit board, and the electronic component arranged in contact with the solder paste. The arrangement is then heated to vaporize the vehicle and to melt and coalesce the solder particles, which is referred to as reflow. Upon cooling, the solder solidifies to bond the electronic component to the printed circuit board.

Solder reflow is carried out by conveying the workpiece, which comprises the arrangement of the electronic component and the printed circuit board with the solder paste, through an oven. An example of an oven is described in U.S. patent application Ser. No. 10/007,485. filed Dec. 3, 2001, and assigned to the assignee of the present invention. Within the oven, the workpiece is initially preheated to a temperature just below the solder melting temperature. The workpiece is then heated using hot air to a temperature effective to reflow the solder. Reheated air is distributed through the reflow zone by an air distribution system that includes an elongated nozzle for directing the air into the workpiece. In accordance with the aforementioned patent application, a nozzle includes vanes for directing the heated air laterally relative to the direction of travel of the workpiece to provide more uniform heating.

In a conventional nozzle, the air outlet is defined by plates that are perpendicular to the workpiece. Referring to FIG. 1, an example is shown of a conventional nozzle 20 for directing heated air into a workpiece 10 comprising an electronic component 12 and a printed circuit board 14. Workpiece 10 is transported through the reflow zone on a conveyer 16 in the direction of arrow 18. The opening from the nozzle is defined by vanes 21 that are perpendicular to direction 18. Air emerging from the nozzle adjacent vanes 21 forms shear layers 22 that are characterized by turbulence that cause mixing of the heated air with surrounding, relatively cooler air. This mixing reduces the temperature within the shear layers below the effective reflow temperature. As a result, the workpiece is heated above the solder reflow temperature only over a relatively short distance between the shear layers. In order to heat workpiece 10 for time sufficient to accomplish the desired reflow, it is necessary to reduce the speed of the conveyor. While it is possible to increase the temperature of the heated air to increase the temperature within the shear zones, this may result in overheating of the workpiece within the region between the shear layers and is not desired. Moreover, the air delivery system is confined by spacial constraints within the oven so that the width of opening cannot be readily increased to lengthen the reflow zone.

Therefore, a need exists for a solder reflow oven having a reflow zone that uses heated air to heat a workpiece to a temperature effective to reflow solder, which is capable of increasing the distance over which the workpiece is heated to solder reflow temperature without interfering with upstream and downstream regions of the oven.

BRIEF SUMMARY OF THE INVENTION

In accordance with this invention, a solder reflow oven comprises a heating zone for heating a workpiece that includes a solder to a temperature effective to reflow the solder. The oven includes a conveyor for transporting the workpiece in a direction sequentially through a pre-reflow zone, the heating zone and a post-reflow zone. A plenum supplies heated air to the heating zone and includes sides that define a plenum opening having a first dimension in the direction of travel. A nozzle is interposed between the plenum opening and the conveyor and receives heated air from the plenum and directs said heated air toward the conveyor. The nozzle includes a front wall and a rear wall in divergent relationship and defining a nozzle opening adjacent the conveyor that has a dimension less than or equal to the dimension of the plenum opening. In this manner, the nozzle is confined within the heating zone and directs shear layers associated with heated air exiting the nozzle opening toward the pre-flow and post-reflow zones, respectively, thereby increasing the distance over which the workpiece is heated to solder reflow temperatures. This is accomplished without the necessity for increasing the temperature of the heated air and while confining the plenum and nozzle to the reflow zone so as not to interfere with equipment or operation in neighboring zones.

BRIEF DESCRIPTION OF THE DRAWINGS

This invention will be further described with reference to the following drawings wherein.

DETAILED DESCRIPTION OF THE INVENTION

Figure 1:
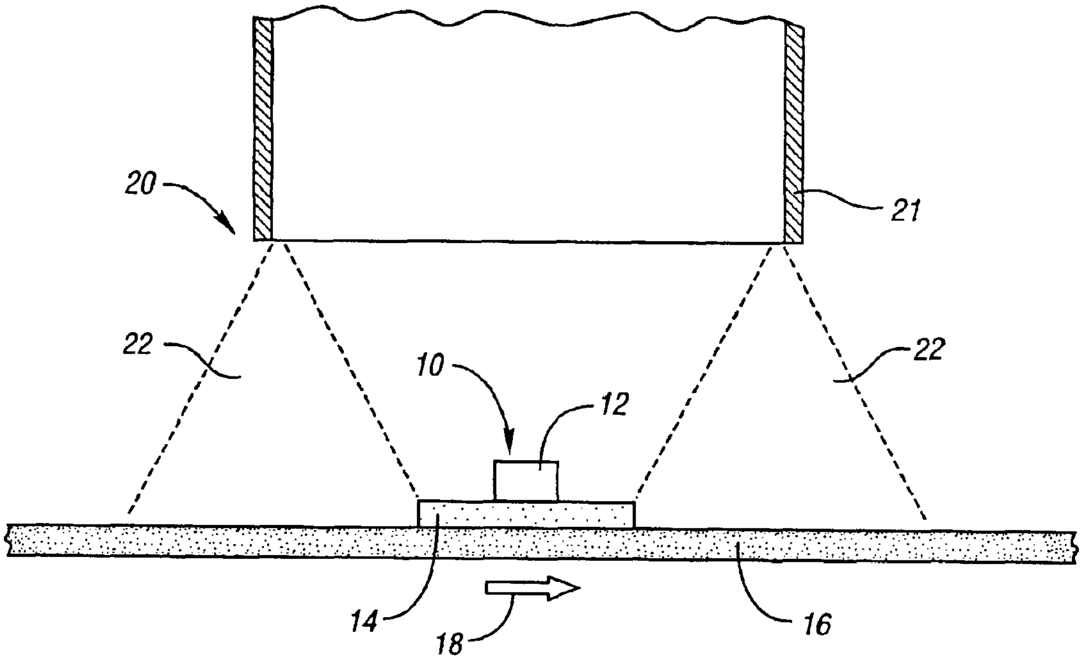
Fig. 1 (PRIOR ART)
FIG. 1 is a schematic view showing a solder reflow zone of a solder reflow oven in accordance with the prior art.
Figure 2:
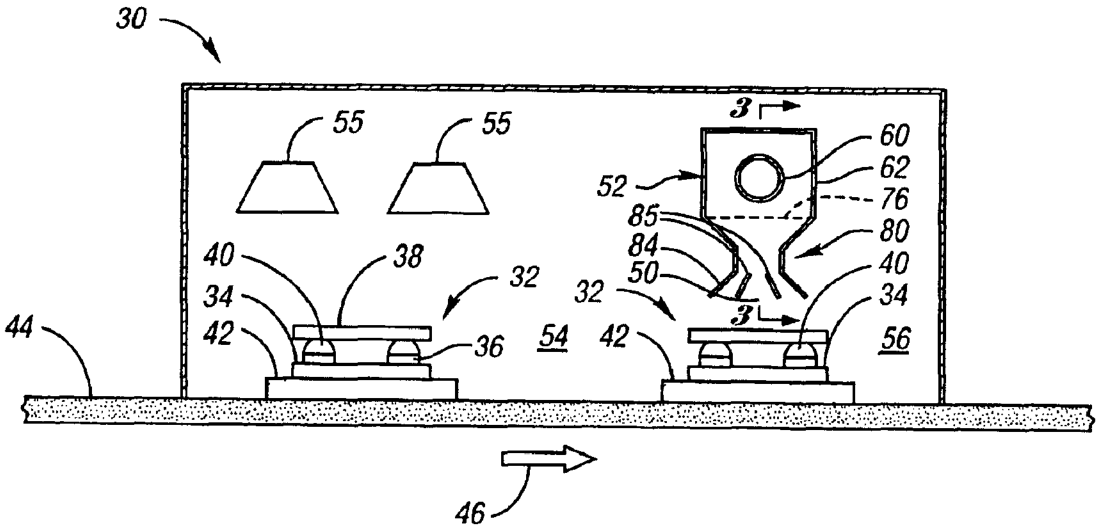
FIG. 2 is a schematic view of a solder reflow oven in accordance with the present invention.
Figure 3:
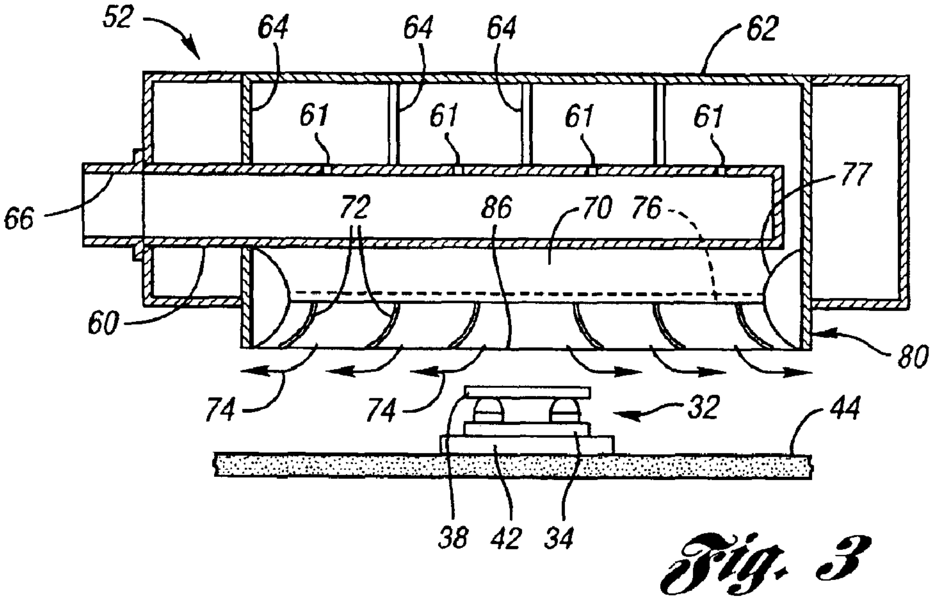
FIG. 3 is a cross-sectional view of the oven in FIG. 2, taken along lines 3—3 in the direction of the arrows.
Figure 4:
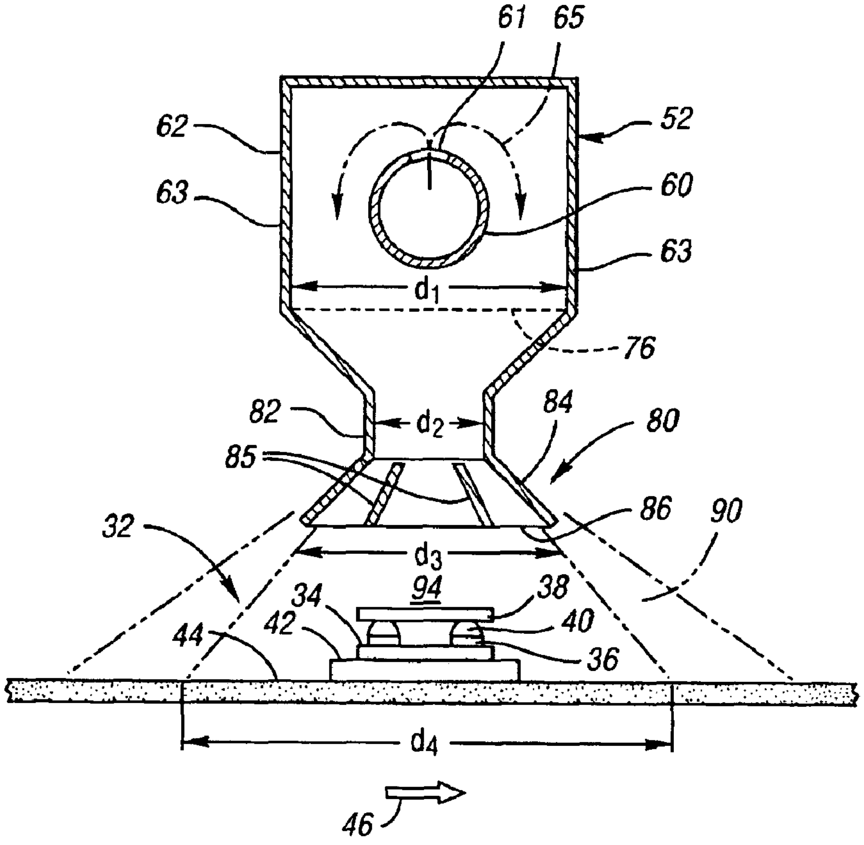
FIG. 4 is a schematic view showing details of the heating zone within the solder reflow oven in FIG. 3.

In accordance with the preferred embodiment of this invention, referring to FIGS. 2 through 4, a solder reflow oven 30 is provided for heating a workpiece 32 to form a microelectronic assembly. Workpiece 32 includes a printed circuit board 34 and one or more electronic components 38. Printed circuit board 34 includes a plurality of bond pads 36 to which a solder paste 40 is applied. Solder paste 40 comprises particles of a solder alloy dispersed within a vaporizable vehicle. The paste may include a suitable flux to enhance wetting of the bond pads and component by the liquid solder. In preparation for assembly, paste 40 is applied to the bond pads, and electronic components 38 are positioned onto the printed circuit board in contact with the solder paste. Workpiece 32 is then loaded onto a pallet 42 to facilitate handling and transporting of the workpiece through the oven.

Oven 30 comprises a conveyor 44 for transporting workpiece 32 through the oven in the direction of arrow 46. Oven 30 comprises a reflow zone 50 that includes a heated air delivery system 52 for heating workpiece 32 to a temperature effective to reflow solder. Oven 30 also comprises pre-reflow zone 54 which includes heaters 55 for preheating workpiece 32 to a temperature less than solder reflow temperatures. Zone 54 may include multiple heating regions equipped with partitions and fans for heating the workpiece in accordance with a desired time and temperature regimen. Oven 30 also includes a post-reflow zone 56 to which the workpiece is transported following reflow zone 50. In region 56, workpiece 32 undergoes a controlled cool down to solidify the solder and form the desired bonds.

Referring more particularly to FIG. 3, there is depicted a cross-sectional view of air delivery system 52. System 52 includes an air distribution pipe 60 supported within a plenum 62 by brackets 64. Plenum 62 includes front and rear sides 63. Pipe 60 includes an inlet 66 for receiving air from a heater (not shown) and outlets 61 oriented to face away from conveyor 44. Heated air flows from outlets 61 through plenum 62 about pipe 60 as indicated by vanes 65, and exits through an opening adjacent workpiece 32 and conveyor 44. A perforated plate 76 at the opening between sides 63 provides diffuse air flow from the plenum 62.

In accordance with this invention, a nozzle 80 is provided for directing heated air from plenum 62 toward workpiece 32 in an optimum flow pattern. Nozzle 80 includes a plurality of vanes 72, as shown in FIG. 3, for directing air flow transverse to direction 18, the direction of travel of workpiece 32, as indicated by arrows 74 in FIG. 3. Flow is assisted by a pair of deflectors 77 located at the ends of nozzle 80. It is found that the transverse air flow laterally across workpiece 32 provides more uniform heating of the workpiece within the reflow zone. In addition, nozzle 80 includes a constricted section 82 that is constricted in the direction 46, and divergent vanes 84 that define an exit opening 86 proximate to the workpiece. Auxiliary vanes 84 assist in providing the desired divergent air flow and intersect vanes 72 in a criss-cross pattern Referring to FIG. 4, dimension $d_1$ indicates the dimension of the opening in plenum 62 between side walls 63 parallel to direction 46, the direction of travel of workpiece 32. Constriction 82 has a width, $d_2$, in direction 46 less than opening dimension $d_1$. The opening 86 in divergent plates 84 has a dimension $d_3$ in direction 46 that is greater than the width $d_2$ of constriction 82. Moreover, in a preferred embodiment, dimension $d_3$ of opening 86 is not greater than dimension $d_1$ of plenum 62, so that the nozzle is contained in reflow zone 50 and does not extend into adjacent zones 54 and 56.

During operation, a workpiece 30 is loaded onto conveyor 44 and transported sequentially through pre-reflow zone 54, reflow zone 50, and post-reflow zone 56. By way of an example, workpiece 32 may suitably comprise solder paste 40 containing a tin-lead solder alloy having a melting temperature of about Within pre-reflow zone 54, workpiece 32 is heated to a temperature effective to vaporize the vehicle in the paste and actuate the flux. The workpiece 32 then passes through reflow zone 50, whereupon workpiece 32 is heated by air delivered by air delivery system 52. Air is heated by an external heating device (not shown) and directed into pipe 60 through inlet 66, whereupon the air flows through openings 61 into plenum 62. The healed air flows from plenum 62 through perforated plate 76 and into nozzle 80. The heated air then flows through constricted section 82 and divergent vanes 84 and is expelled though opening 86 in the direction of workpiece 32. The flow of air past divergent vanes 84 creates shear zones 90 wherein turbulence cause the heated air to mix with surrounding, relatively cooler air in neighboring zones 54 and 56. As a result, the temperature within shear layers 90 is reduced to less than the effective solder reflow temperature. However, divergent vanes 84 direct shear zones 90 toward the upstream region 54 and downstream region 56 and thereby extends the distance $d_4$ therebetween whereat the temperature is effective to reflow the solder. Preferably, the effective solder reflow distance $d_4$ at conveyor 44 is greater than the plenum width $d_1$ or the nozzle opening $d_3$.

Therefore, this invention provides a solder reflow oven that includes a reflow zone having an extended distance over which the workpiece is heated to solder reflow temperatures. This is attributed to the use of a nozzle having divergent vanes. The divergent vanes direct the shear layers into neighboring zones of the reflow oven, thereby maximizing the distance within the reflow zone at which the workpiece is at effective reflow temperatures. Preferably, this is accomplished without extending the nozzle or the divergent vanes into the neighboring zones, so as not to interfere with equipment or processes carried therein While this invention has been described in terms of certain embodiments thereof, it is not intended to be so limited, but rather only to the extent set forth in the claims that follow.

What is claimed is:

1. A solder reflow oven comprising a reflow zone for heating a workpiece that includes a solder to a temperature effective to reflow said solder, and a pre-reflow zone and a post-reflow zone about said reflow zone, said solder reflow oven further comprising:

a conveyor for transporting the workpiece in a travel direction sequentially through the pre-reflow zone, the reflow zone and the post-reflow zone;

a plenum for supplying heated air to the reflow zone, said plenum comprising a front side and a rear side in spaced relationship transverse to the travel direction and defining a plenum opening therebetween, said plenum opening having a first dimension in said travel direction; and a nozzle for receiving heated air from said plenum and directing said heated air toward said conveyor, said nozzle comprising front and rear vanes in divergent relationship and defining a nozzle opening adjacent the conveyor having a second dimension in said travel direction less than or equal to the first dimension.

2. A solder reflow oven in accordance with claim 1 wherein the nozzle comprises a constriction intermediate the plenum opening and the nozzle opening and having a third dimension in said travel direction less than said first dimension.

3. A solder reflow oven in accordance with claim 1, wherein said front vane of said nozzle is effective to create a shear layer in a direction toward said pre-reflow zone.

4. A solder reflow oven in accordance with claim 1, wherein said rear vane of sad nozzle is effective to create a shear layer in a direction to direct air toward said post-reflow zone.

5. A solder reflow oven in accordance with claim 1, wherein said workpiece comprises a printed circuit board having bond pads, a solder paste applied to said bond pads, and an electronic component arranged in said printed circuit board in contact with said solder paste.

6. A solder reflow oven in accordance with claim 1, wherein said solder includes a flux, and the second temperature is effective to activate the flux.

7. A solder reflow oven in accordance with claim 1, wherein the nozzle further comprises vanes extending in said travel direction and shaped for directing air flow transverse to said travel direction.

8. A solder reflow oven in accordance with claim 1, further comprising auxiliary vanes interposed between the front and rear vanes.

9. A solder reflow oven comprising a reflow zone for heating a workpiece that includes a solder to a temperature effective to reflow said solder, and an a pre-reflow zone and a post-reflow zone about said reflow zone, said solder reflow oven further comprising:

a conveyor for transporting the workpiece in a travel direction sequentially through the pre-reflow zone, the reflow zone and the post-reflow zone;

a plenum for supplying heated air to the reflow zone, said plenum comprising a front side and a rear side in spaced relationship transverse to the travel direction and defining a plenum opening therebetween, said plenum opening having a first dimension in said travel direction;

a nozzle for receiving heated air from said plenum and directing said heated air toward said conveyor, said nozzle comprising front and rear vanes in divergent relationship and defining a nozzle opening adjacent the conveyor having a second dimension in said travel direction less than or equal to the first dimension; and at least one heater configured to supply heated air to the pre-reflow zone, said heater not connected to the plenum for supplying heated air to the reflow zone.

10. A solder reflow oven in accordance with claim 9, wherein the solder includes a vaporizable vehicle, and the pre-reflow zone includes a second temperature effective to vaporize the vehicle of the solder.

11. A solder reflow oven in accordance with claim 10, wherein the solder includes a flux, and the second temperature is effective to activate the flux.

12. A solder reflow oven comprising a reflow zone for heating a workpiece that includes a solder to a temperature effective to reflow said solder, and an a pre-reflow zone and a post-reflow zone about said reflow zone, said solder reflow oven further comprising:

a conveyor for transporting the workpiece in a travel direction sequentially through the pre-reflow zone, the reflow zone and the post-reflow zone;

a plenum for supplying heated air to the reflow zone, said plenum comprising a front side and a rear side in spaced relationship transverse to the travel direction and defining a plenum opening therebetween, said plenum opening having a first dimension in said travel direction; and a nozzle for receiving heated air from said plenum and directing said heated air toward said conveyor, said nozzle including front and rear vanes in divergent relationship and defining a nozzle opening adjacent the conveyor having a second dimension in said travel direction less than or equal to the first dimension, and said nozzle including at least one vane extending in said travel direction and shaped for directing air flow transverse to said travel direction.

13. A solder reflow oven in accordance with claim 12, further comprising auxiliary vanes interposed between the front and rear vanes.

14. A solder reflow oven in accordance with claim 13, wherein the auxiliary vanes extend perpendicular to the travel direction.

* * * * *

UNITED STATES PATENT AND TRADEMARK OFFICE

CERTIFICATE OF CORRECTION

PATENT NO. : 6,794,616 B1 
DATED : September 21, 2004
INVENTOR(S) : Lakhi Nandlal Goenka It is certified that error appears in the above-identified patent and that said Letters Patent is hereby corrected as shown below:

Title page,
Item [57], ABSTRACT,
Line 3, after "solder" delete "flow" and substitute -- reflow -- in its place.

Column 5,
Line 58, after "said solder, and" delete "an".

Column 6,
Line 3, after "said solder, and" delete "an".

Signed and Sealed this

Sixteenth Day of August, 2005

JON W. DUDAS
*Director of the United States Patent and Trademark Office*

UNITED STATES PATENT AND TRADEMARK OFFICE

CERTIFICATE OF CORRECTION

PATENT NO. : 6,794,616 B1 
DATED : September 21, 2004
INVENTOR(S) : Lakhi Nandlal Goenka It is certified that error appears in the above-identified patent and that said Letters Patent is hereby corrected as shown below:

Title page,
Item [57], ABSTRACT,
Line 1, after “solder” delete “flow” and substitute -- reflow -- in its place.

Column 5,
Line 6, after “said solder, and” delete “an”.

Column 6,
Line 3, after “said solder, and” delete “an”.

This certificate supersedes Certificate of Correction issued August 16, 2005.

Signed and Sealed this

Thirteenth Day of December, 2005

JON W. DUDAS
*Director of the United States Patent and Trademark Office*